United States Patent
Imura et al.

(10) Patent No.: US 8,685,585 B2
(45) Date of Patent: Apr. 1, 2014

(54) FUEL CELL AND METHOD FOR CONNECTING CURRENT CONNECTORS THERETO

(75) Inventors: Shinichiro Imura, Hyogo (JP); Takashi Yasuo, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 1532 days.

(21) Appl. No.: 12/071,840

(22) Filed: Feb. 27, 2008

(65) Prior Publication Data

US 2008/0206619 A1 Aug. 28, 2008

(30) Foreign Application Priority Data

Feb. 27, 2007 (JP) ................................. 2007-047984

(51) Int. Cl.
*H01M 8/10* (2006.01)
*H01M 2/08* (2006.01)
*H01M 8/00* (2006.01)

(52) U.S. Cl.
USPC ........... 429/453; 429/452; 429/467; 429/507; 429/508

(58) Field of Classification Search
USPC ........................ 429/452, 453, 467, 507, 508
See application file for complete search history.

(56) References Cited

U.S. PATENT DOCUMENTS

| | | | |
|---|---|---|---|
| 5,925,477 A * | 7/1999 | Ledjeff et al. ................. | 429/465 |
| 5,989,741 A * | 11/1999 | Bloomfield et al. ........... | 429/465 |
| 6,689,502 B2 * | 2/2004 | Choi .............................. | 429/457 |
| 2004/0151961 A1 * | 8/2004 | Morishima et al. ............. | 429/32 |
| 2005/0074651 A1 * | 4/2005 | Kidai et al. ..................... | 429/30 |
| 2005/0172482 A1 * | 8/2005 | Morishima et al. ............. | 29/730 |
| 2006/0029860 A1 * | 2/2006 | Ketcham et al. ............... | 429/209 |
| 2006/0269829 A1 * | 11/2006 | Choi et al. ...................... | 429/44 |
| 2007/0190379 A1 * | 8/2007 | Song et al. ...................... | 429/24 |
| 2008/0003486 A1 * | 1/2008 | Shu et al. ........................ | 429/44 |

FOREIGN PATENT DOCUMENTS

| | | |
|---|---|---|
| JP | 2003-197225 A | 7/2003 |
| JP | 2004-146092 | 5/2004 |
| WO | WO 2006/069031 A2 | 6/2006 |

OTHER PUBLICATIONS

Chinese Office Action, with English Translation, issued in Chinese Patent Application No. 200810004940.2, dated Sep. 5, 2011.
Japanese Office Action, and English translation thereof, issued in Japanese Patent Application No. 2007-047984 mailed Sep. 25, 2012.

* cited by examiner

*Primary Examiner* — Ula C Ruddock
*Assistant Examiner* — Amanda Barrow
(74) *Attorney, Agent, or Firm* — McDermott Will & Emery LLP

(57) ABSTRACT

In a planar-array cell structure, an area required by interconnectors is reduced and a fuel cell is made further compact. A connection part which connects adjacent cells in series is provided within a sealing member provided in a peripheral edge part of an electrolyte membrane where multiple cells are formed in a planar arrangement. For each cell, an anode terminal of a current collector is disposed counter to a cathode terminal of the current collector via the electrolyte membrane. The connection part penetrates the electrolyte membrane and connects the anode terminal of one of the adjacent cells to the cathode terminal of the other of the adjacent cells.

5 Claims, 11 Drawing Sheets

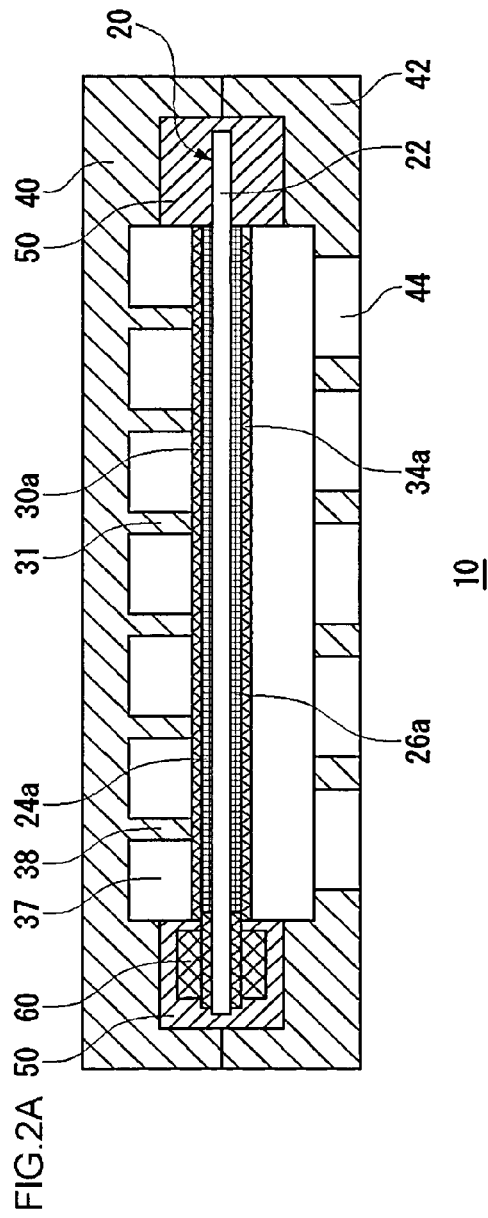
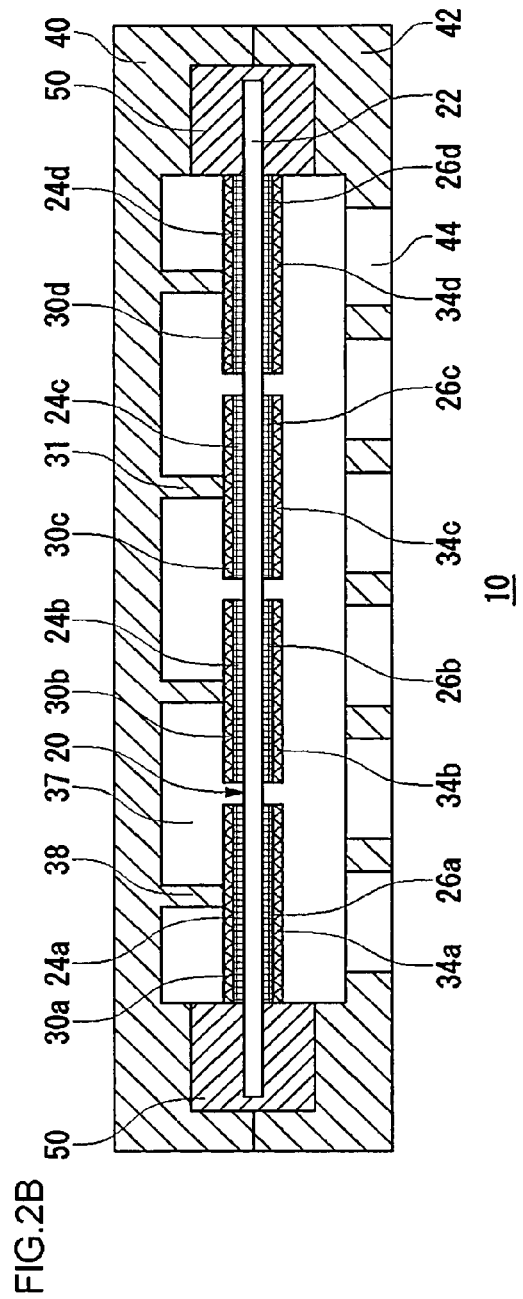
FIG.2A
FIG.2B

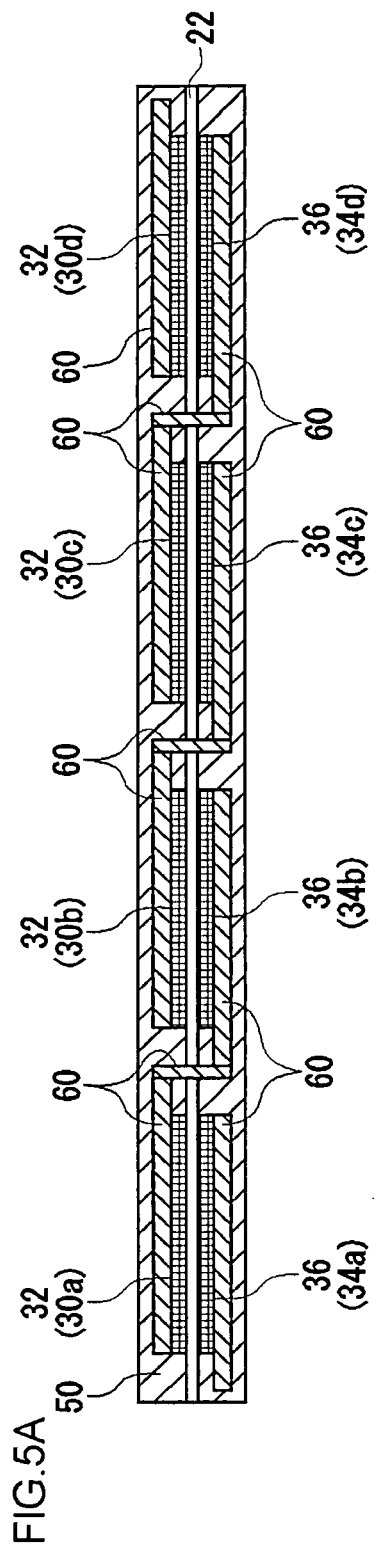
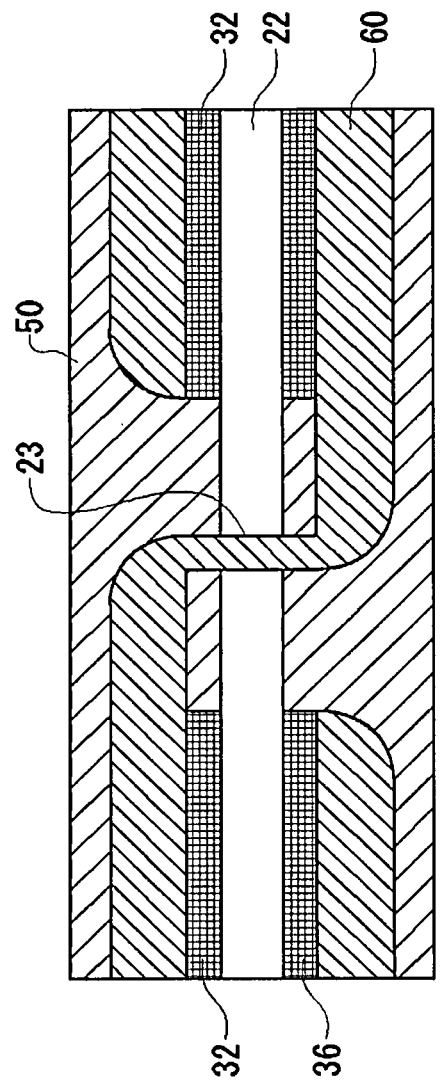
FIG.5A
FIG.5B

FUEL CELL AND METHOD FOR CONNECTING CURRENT CONNECTORS THERETO

CROSS-REFERENCE TO RELATED APPLICATIONS

This application is based upon and claims the benefit of priority from the prior Japanese patent application No. 2007-047984, filed on Feb. 27, 2007, the entire contents of which are incorporated herein by reference.

BACKGROUND OF THE INVENTION

1. Field of the Invention

The present invention relates to a fuel cell. More particularly, the invention relates to a fuel cell with its cells disposed in a planar arrangement and a method for connecting current collectors thereto.

2. Description of the Related Art

A fuel cell is a device that generates electricity from hydrogen and oxygen so as to obtain highly efficient power generation. A principal feature of the fuel cell is its capacity for direct power generation which does not undergo a stage of thermal energy or kinetic energy as in the conventional power generation. This presents such advantages as high power generation efficiency despite the small scale setup, reduced emission of nitrogen compounds and the like, and environmental friendliness on account of minimal noise or vibration. In this manner, the fuel cells are capable of efficiently utilizing chemical energy in its fuel and, as such, environmentally friendly. Fuel cells are therefore expected as an energy supply system for the twenty-first century and have gained attention as a promising power generation system that can be used in a variety of applications including space applications, automobiles, mobile devices, and large and small scale power generation. Serious technical efforts are being made to develop practical fuel cells.

Known as one of such fuel cells described above is a polymer electrolyte fuel cell (PEFC) that operates at a low temperature of less than or equal to 100° C. As one type of this PEFC, known are a type where hydrogen is used as a fuel, a type where a direct methanol fuel cell (DMFC) where methanol water solution as a fuel is not reformed and is directly supplied to the anode so as to produce the electric power by an electrochemical reaction induced between the methanol water solution and oxygen, and the like. It is expected that PEFC will be used in power supplies for mobile devices such as cell phones, notebook-size personal computers, PDAs, MP3 players, digital cameras, electronic dictionaries and books.

With a conventional planar fuel cell, in which the cells are disposed in a planar arrangement, the terminal of a current collector is extended to an end of an electrolyte membrane in order to electrically connect adjacent cells with each other by a connector (interconnector). This configuration has resulted in an area of a current collector larger than necessary and a long terminal of the current collector, which leads to a proportionately larger resistance.

Also, as a known example, there is a structure in which an interconnector is provided in a through-hole in an electrolyte membrane between adjacent cells. However, this structure can present a problem when the compactness of the fuel cell is the primary concern. That is, as the distance between the electrodes are reduced, there can occur shorts between the adjacent electrodes or cross leaks in the through-hole area.

SUMMARY OF THE INVENTION

The present invention has been made to resolve the foregoing problems, and a general purpose thereof is to provide a technology for reducing the area of current collectors in a fuel cell with its cells disposed in a planar arrangement without compromising its connection reliability. An advantage of the present invention is to provide a technology that realizes closer proximity of cells while preventing shorts between adjacent electrodes in a fuel cell with its cells disposed in a planar arrangement.

One embodiment of the present invention relates to a fuel cell. The fuel cell comprises: an electrolyte membrane; a plurality of anodes provided on one face of the electrolyte membrane; a plurality of cathodes provided on the other face of the electrolyte membrane counter to the plurality of anodes so as to form cells; anode current collectors provided in association with the plurality of anodes, respectively; cathode current collectors provided in association with the plurality of cathodes, respectively; a sealing member which seals a peripheral edge part of the electrolyte membrane; and a connector which connects the anode current collector of one of adjacent cells with the cathode current collector of the other thereof within the sealing member.

Since the connector are provided within the sealing member sealing the peripheral edge part of the electrolyte membrane, adjacent cells can be connected in series while limiting the area of current collectors to a requisite minimum.

In the fuel cell according to the above-described embodiment, through-holes for the connector penetrating the peripheral edge part of the electrolyte membrane may be provided such that they are each positioned between anode current collectors and between cathode current collectors of adjacent cells.

In a fuel cell according to any one of the above-described embodiments, the width of each anode current collector and each cathode current collector protruding into the peripheral edge part of the electrolyte membrane may be smaller than the width of a cell. Such an arrangement widens the distance between the terminals of adjacent current collectors, thus improving the insulation of adjacent current collectors against each other.

Another embodiment of the present invention relates to a method for connecting current collectors to a fuel cell. In this method, a first metal pattern having a contact surface in contact with an anode current collector and a connecting terminal and a second metal pattern having a contact surface in contact with a cathode current collector and a connecting terminal are embedded on a sealing member, and the sealing member is folded back between the first metal pattern and the second metal pattern. Then a peripheral edge part of an electrolyte membrane held between the anode current collectors and the cathode current collectors is inserted between the first metal pattern and the second metal pattern. The anode current collectors and the cathode current collectors are press-bonded between the first metal pattern and the second metal pattern so as to connect the connecting terminal of the first metal pattern and the connecting terminal of the second metal pattern of adjacent cells.

This arrangement makes it possible to simplify the manufacturing process of the fuel cell because leak prevention of fuel or the like and series connection of the adjacent cells can be achieved at the same time.

It is to be noted that any arbitrary combination or rearrangement of the above-described structural components and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 2A is a cross-sectional view taken along line A-A' of FIG. 1; and FIG. 2B is a cross-sectional view taken along line B-B' of FIG. 1;

FIG. 5A is a cross-sectional view (taken along line C-C' of FIG. 1) showing a structure of a connector; and FIG. 5B is a cross-sectional view of a major portion of connector;

DETAILED DESCRIPTION OF THE INVENTION

The invention will now be described by reference to the preferred embodiments. This does not intend to limit the scope of the present invention, but to exemplify the invention.

Hereinbelow, the embodiments will be described with reference to the accompanying drawings.

Figure 1:
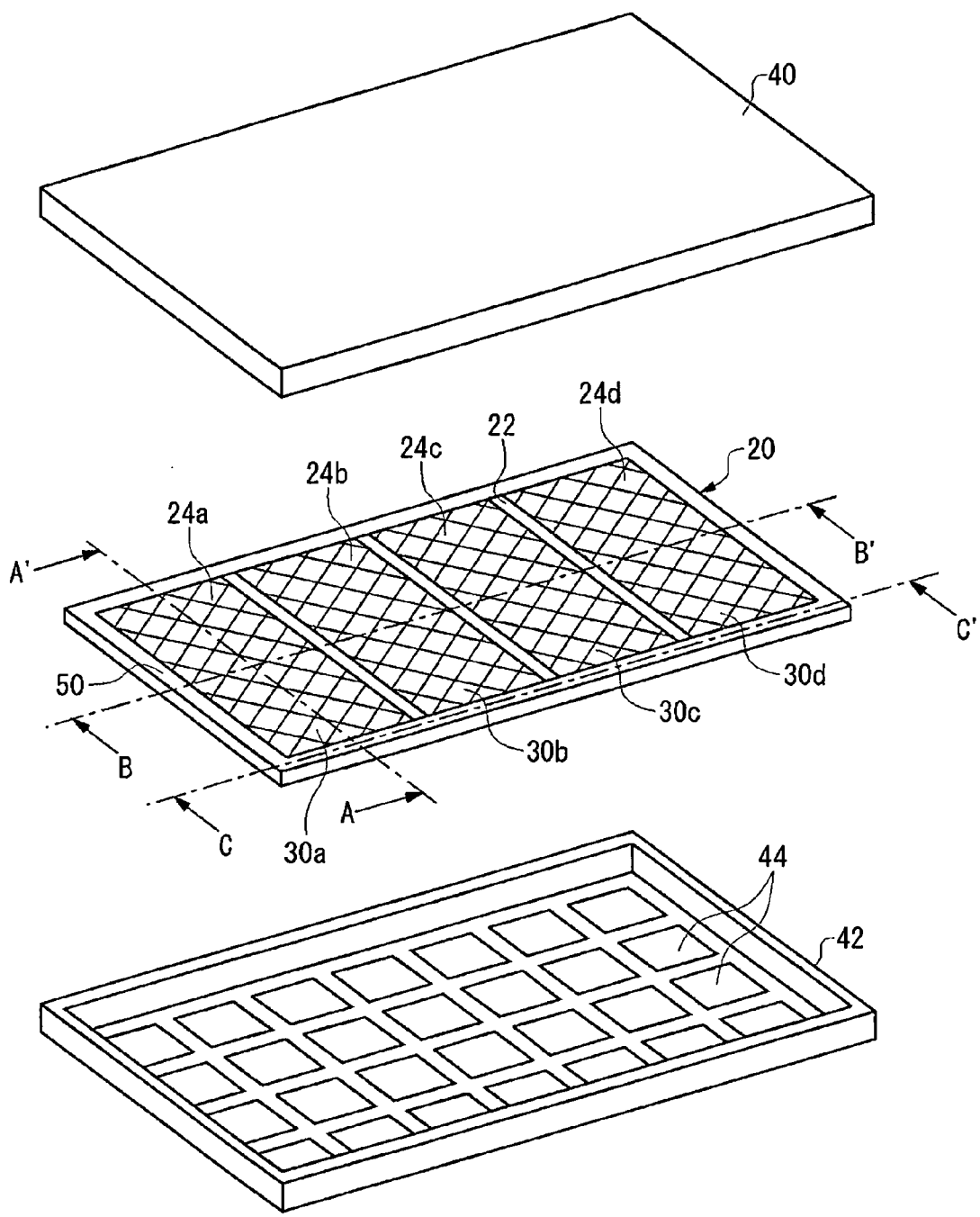
FIG. 1 is an exploded perspective view showing a structure of a fuel cell according to an embodiment of the present invention.

FIG. 1 is an exploded perspective view showing a structure of a fuel cell 10 according to an embodiment of the present invention. FIG. 2A and FIG. 2B are cross-sectional views taken along line A-A' and the line B-B' of FIG. 1, respectively. As illustrated in FIG. 1 and FIGS. 2A and 2B, the fuel cell 10 includes a membrane electrode assembly (MEA, also called a catalyst coated membrane (CCM)) 20, an anode housing 40, and a cathode housing 42. A sealing member 50 to be described later is provided around the peripheral edge part of the membrane electrode assembly 20.

The membrane electrode assembly 20 includes an electrolyte membrane 22, anodes 24a to 24d, and cathodes 26a to 26d, which are disposed counter to the anodes 24a to 24d, respectively. Fuel is supplied to the anodes 24a to 24d. Air is supplied to the cathodes 26a to 26d. The fuel cell 10 generates power through an electrochemical reaction between the fuel and oxygen in the air.

The anodes 24a to 24d are formed on one face of the electrolyte membrane 22 in such a manner as to be slightly apart therefrom. The area of the electrolyte membrane 22 is larger than the total area of the anodes 24a to 24d, and the peripheral edge part of the electrolyte membrane 22 on the anode side surrounds the anodes 24a to 24d. The width of the peripheral area of the electrolyte membrane 22 surrounding the anodes 24a to 24d is, for instance, 2 mm. Similarly, the cathodes 26a to 26d are formed on the other face of the electrolyte membrane 22 in such a manner as to be slightly apart therefrom. The area of the electrolyte membrane 22 is larger than the total area of the cathodes 26a to 26d, and the peripheral edge part of the electrolyte membrane 22 on the cathode side surrounds the cathodes 26a to 26d. The width of the peripheral area of the electrolyte membrane 22 surrounding the cathodes 26a to 26d is, for instance, 2 mm. In this manner, a fuel cell according to the present embodiment is comprised of a plurality of cells in a planar arrangement, which are composed of the respective pairs of the anodes 24a to 24d and the cathodes 26a to 26d. And the adjacent cells are interconnected in series by a connector 60 to be discussed later.

The electrolyte membrane 22, which preferably shows excellent ion conductivity in a moist condition, functions as an ion-exchange membrane for the transfer of protons between the anodes 24 and the cathodes 26. The electrolyte membrane 22 is formed of a solid polymer material such as a fluorine-containing polymer or a nonfluorine polymer. The material that can be used is, for instance, a sulfonic acid type perfluorocarbon polymer, a polysulfone resin, a perfluorocarbon polymer having a phosphonic acid group or a carboxylic acid group, or the like. An example of the sulfonic acid type perfluorocarbon polymer is Nafion 112 (made by DuPont in the U.S.A.: registered trademark). Also, an example of the nonfluorine polymer is a sulfonated aromatic polyether ether ketone, polysulfon or the like.

The anodes 24a to 24d and the cathodes 26a to 26d are each provided with an electrode substrate, ion-exchange resin held thereby, and catalyst-supporting carbon particles.

The electrode substrate that can be used is carbon paper, woven or nonwoven cloth of carbon, or the like. And, if necessary, water repellency may be added by a fluorinated resin such as polytetrafluoroethylene resin (PTFE).

The ion-exchange resin, which connects the catalyst-supporting carbon particles and the electrolyte membrane 22, plays a role of transferring protons therebetween. The ion-exchange resin may be formed of a polymer material similar to that of the electrolyte membrane 22. The catalyst to be supported may be, for instance, any one of or an alloy of any two of platinum, ruthenium, rhodium, and the like. The carbon particles that support the catalyst may be acetylene black, ketjen black, carbon nanotube, or the like.

A fuel storage 37 for storing the fuel is formed by the anode housing 40. The anode housing 40 is provided with ribs 38 which come in contact with the anodes 24. The ribs 38 pressing the anodes 24 improve the current collection performance of the anodes 24. Note that if a fuel supply port (not shown) is formed in the anode housing 40, fuel can be supplied as needed from a fuel cartridge or the like.

On the other hand, the cathode housing 42 has an air inlet 44 for feeding air from outside.

The anode housing 40 and the cathode housing 42 are fastened to each other by fasteners (not shown), such as bolts and nuts, via the sealing member 50. The fasteners giving pressure to the sealing member 50 improve the sealing performance of the sealing member 50.

Figure 3A:
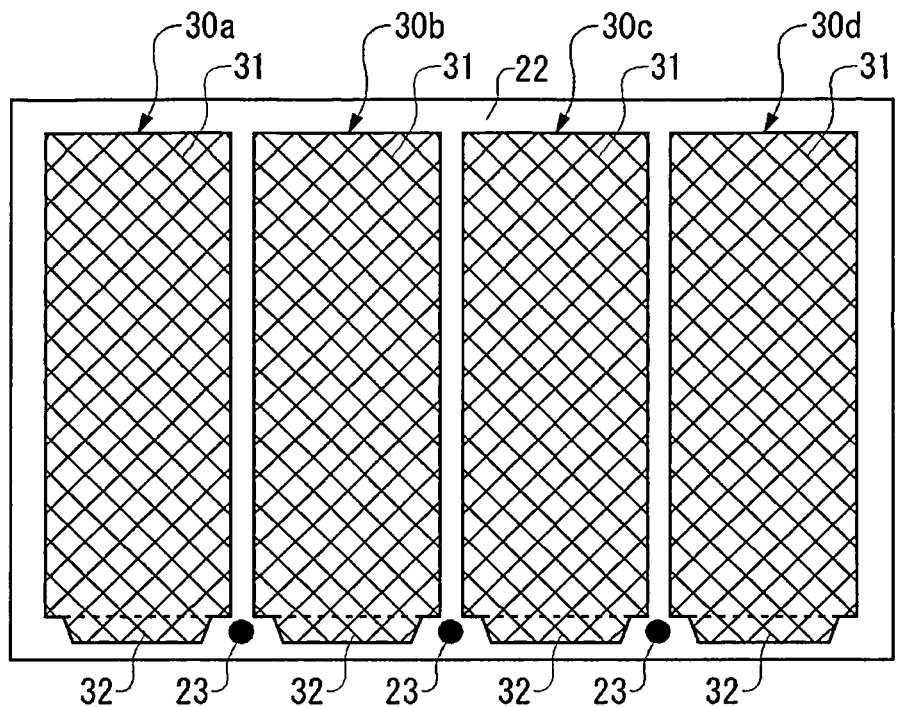
FIG. 3A is a plan view showing current collectors on an anode side.
Figure 3B:
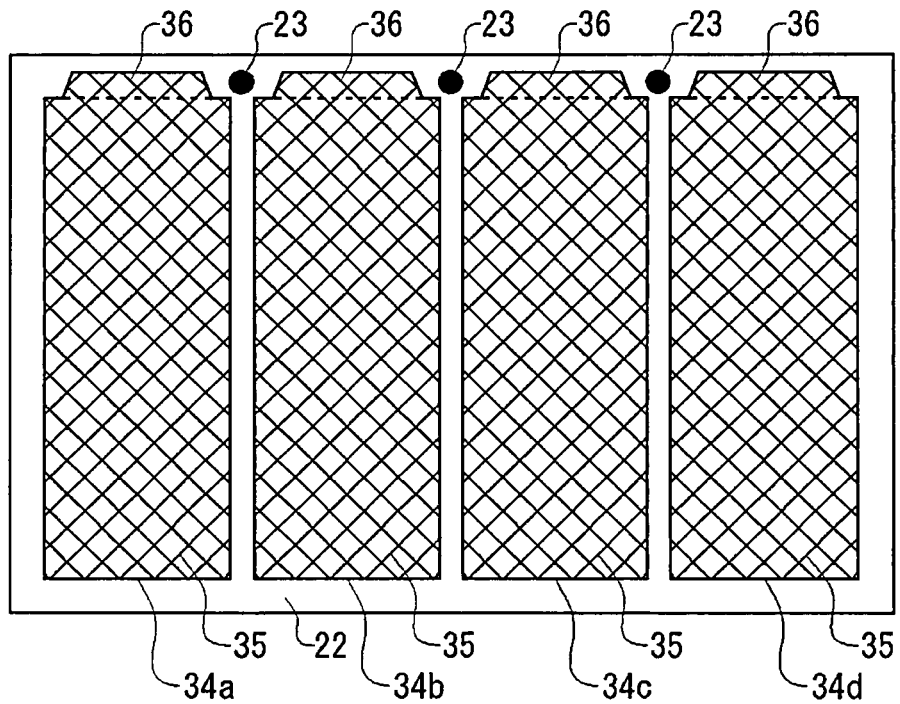
FIG. 3B is a plan view showing current collectors on a cathode side.

FIG. 3A is a plan view showing current collectors on the anode side. FIG. 3B is a plan view showing current collectors on the cathode side. As shown in FIG. 1, FIGS. 2A and 2B, and FIG. 3A, the current collectors 30a to 30d are disposed on the anodes 24a to 24d, respectively. The current collectors 30a to 30d may, for instance, be made of gold mesh. The current collectors 30a to 30d comprise their respective current collection regions 31, which are in contact with the anodes 24a to 24d, and their respective terminals 32, which protrude into the peripheral edge part of the electrolyte membrane 22 outside the anodes 24a to 24d. The width of a terminal 32 is preferably narrower than that of a cell, and further the corners thereof are preferably tapered. Such an arrangement can widen the distance between the through-holes 23 (the details to be discussed later) for interconnectors provided in the peripheral edge part of the electrolyte membrane 22 and the current collectors 30a to 30d, thus preventing shorts from occurring therebetween.

Also, as shown in FIG. 3B and elsewhere, the current collectors 34a to 34d are disposed on the cathodes 26a to 26d, respectively. The current collectors 34a to 34d may, for instance, be made of gold mesh. The current collectors 34a to 34d comprise their respective current collection regions 35, which are in contact with the cathodes 26a to 26d, and their respective terminals 36, which protrude into the peripheral edge part of the electrolyte membrane 22 outside the cathodes 26a to 26d. The width of a terminal 36 is preferably narrower than that of a cell, and further the corners thereof are preferably tapered. Such an arrangement can widen the distance between the through-holes 23 provided in the peripheral edge part of the electrolyte membrane 22 and the current collectors 34a to 34d, thus preventing shorts from occurring therebetween.

Figure 4A:
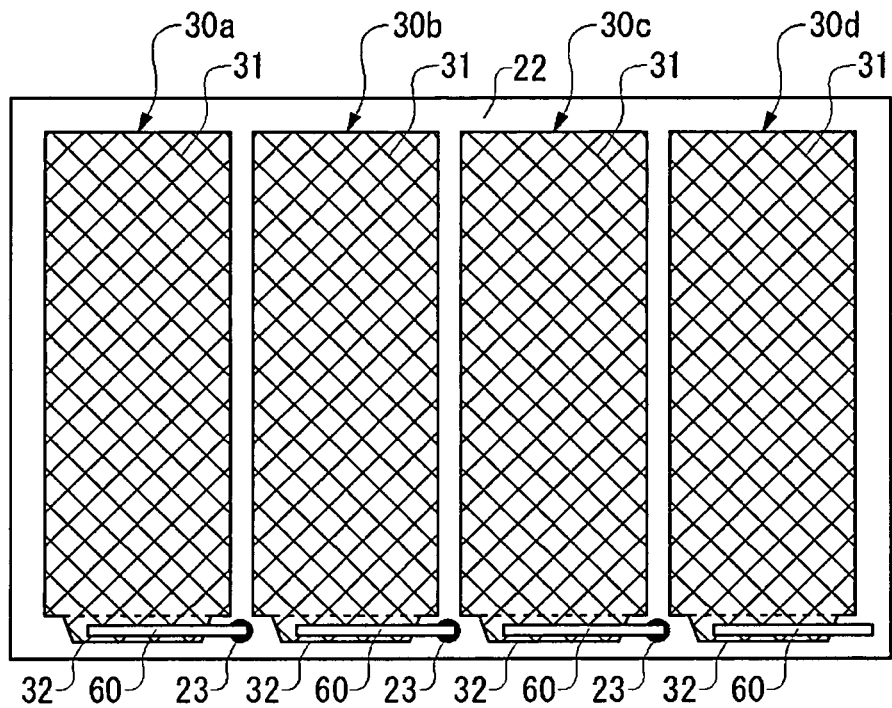
FIG. 4A is a plan view showing a connector on an anode side.
Figure 4B:
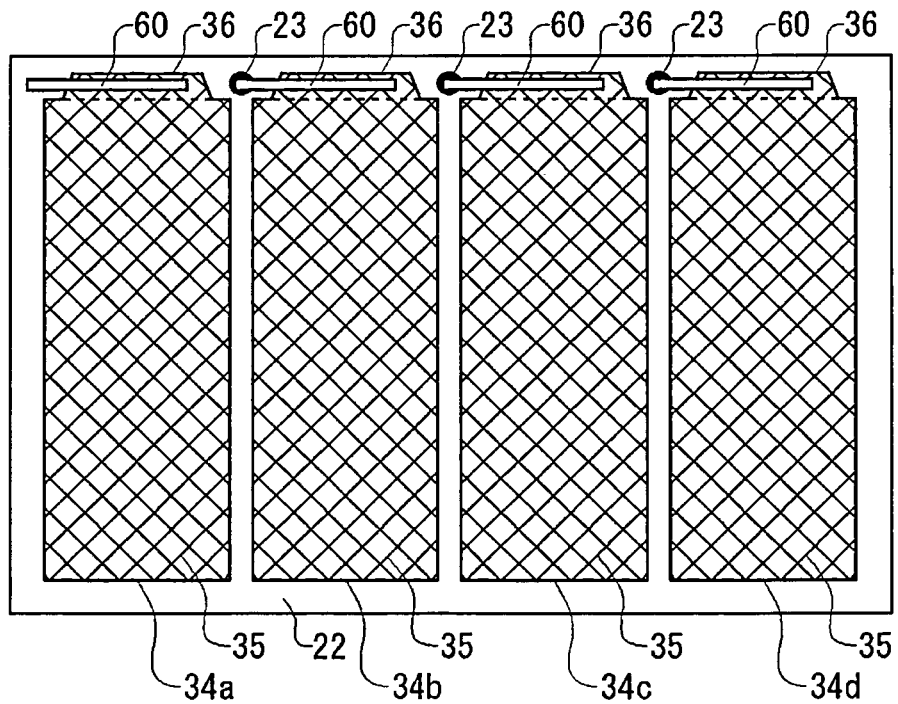
FIG. 4B is plan view showing a connector on a cathode side.

FIG. 4A and FIG. 4B are plan views showing the connector 60 on the anode side and the cathode side, respectively. FIG. 5A is a cross-sectional view (taken along line C-C' of FIG. 1) showing a structure of the connector 60. FIG. 5B is a cross-sectional view of a major portion of the connector 60. As illustrated in FIG. 5A and FIG. 5B, the connector 60 is disposed inside the sealing member 50. The connector (interconnector) 60 connects adjacent cells with each other electrically in series. More specifically, the connector 60 electrically connects the terminal 32 on the anode side of one of the adjacent cells to the terminal 36 on the cathode side of the other of the adjacent cells via the through-hole 23 formed in the electrolyte membrane 22. The material that can be used for the connector 60 may be a metal, such as gold, platinum, aluminum or copper, or a conductor, such as carbon. It is to be noted that the through-hole 23 may be provided in a notched form such that the opening area thereof reaches the edge of the electrolyte membrane 22 in the peripheral edge part thereof.

Referring to FIG. 5A and FIG. 5B, the sealing member 50, which is disposed around the membrane electrode assembly 20 (see FIG. 1), covers the peripheral edge part of the electrolyte membrane 22. As a result, the connector 60, the terminals 32 of the current collectors 30a to 30d, and the terminals 36 of the current collectors 34a to 34d are located inside the sealing member 50. And the sealing member 50 prevents the fuel from leaking outside. The material that can be used for the sealing member 50 may be a fluorinated rubber, such as Viton, a silicon rubber or the like. As already mentioned, the anode housing 40 and the cathode housing 42 are fastened to each other via the sealing member 50, so that the sealing member 50 under pressure displays high sealing performance.

According to the present embodiment, the connector are provided within a sealing member sealing the peripheral edge part of an electrolyte membrane, so that adjacent cells can be connected in series while limiting the area of current collectors to a requisite minimum. Also, an arrangement to make the width of the terminal of each current collector narrower than that of a cell and further have the corners of the terminal tapered can widen the distance between the terminals of adjacent current collectors, thus improving the insulation when through-holes for interconnectors are provided in the electrolyte membrane between the terminals. Also, the through-holes through which the connector penetrate are provided inside a sealing member for sealing the peripheral edge part of the electrolyte membrane, so that cross leak of fuel and/or air in the through-hole areas can be prevented.

(Method for Connecting Fuel Cell Current Collectors)

Figure 6:
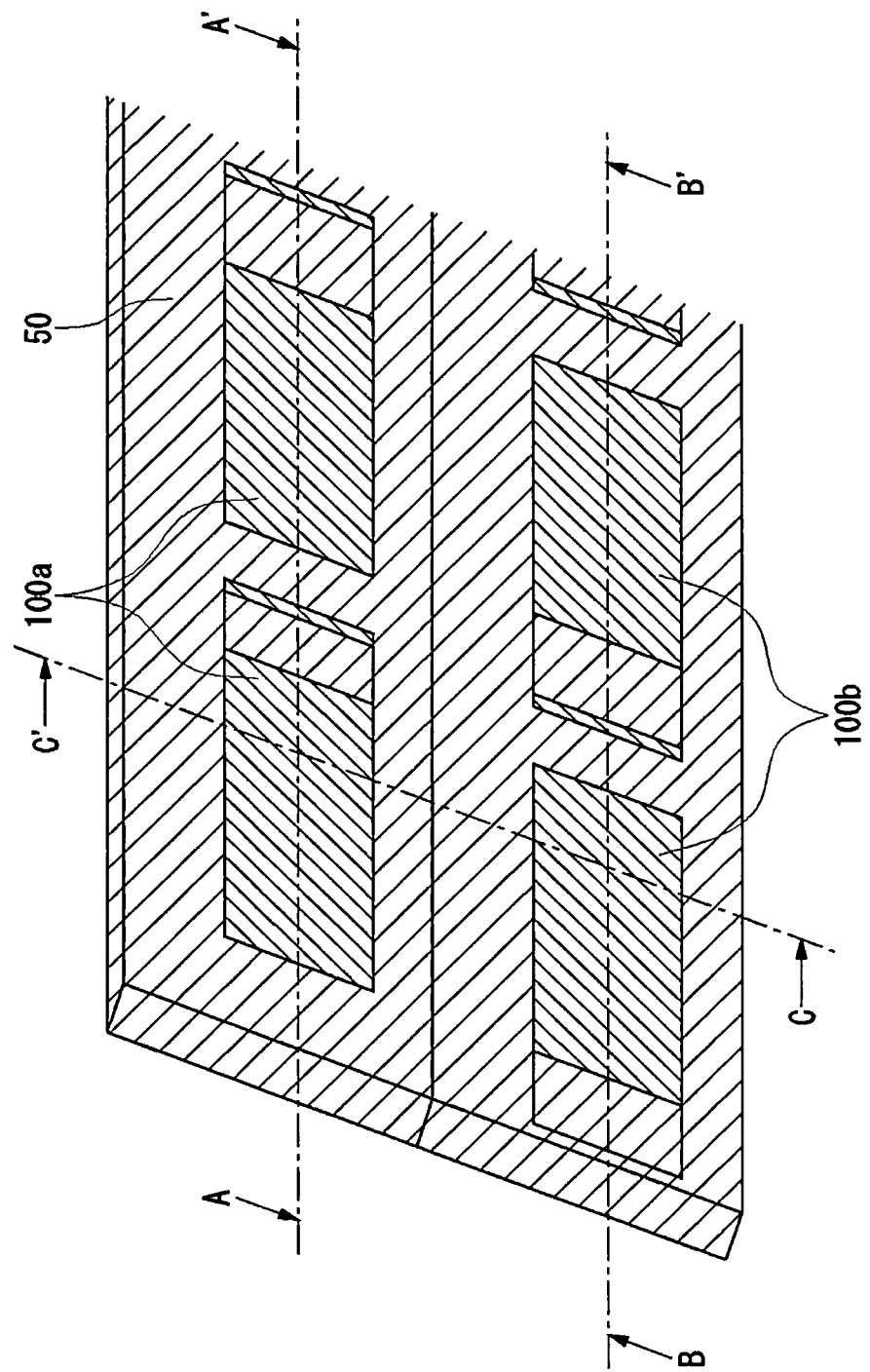
FIG. 6 is a perspective view of a sealing member used to connect current collectors for a fuel cell.

Now a description will be given of a method for connecting current collectors for a fuel cell. As illustrated in FIG. 6, anode-side metal patterns 100a and cathode-side metal patterns 100b are first disposed in predetermined positions of a tape-shaped sealing member 50, using a hot-press or metallic paste printing method. Material that can be used for the metal patterns 100a and 100b may be a corrosive-resistant metal, such as gold or platinum, or a material like SUS which is surface-treated with a precious metal.

Figure 7A:
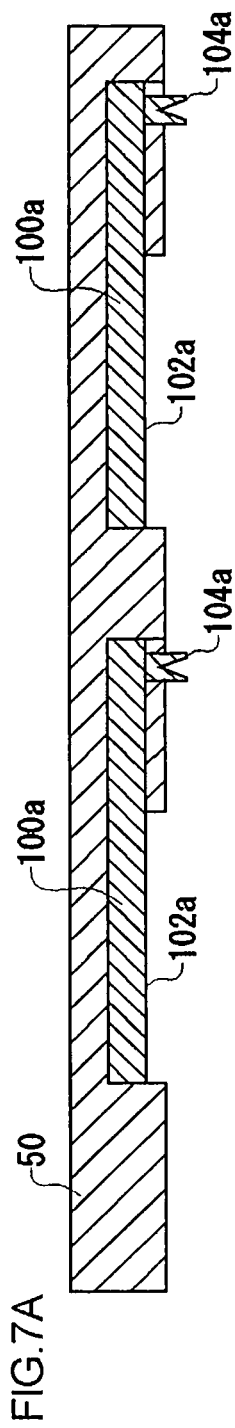
FIG. 7A is a cross-sectional view taken along line A-A' of FIG. 6 in a sealing member used to connect current collectors for a fuel cell.
Figure 7B:
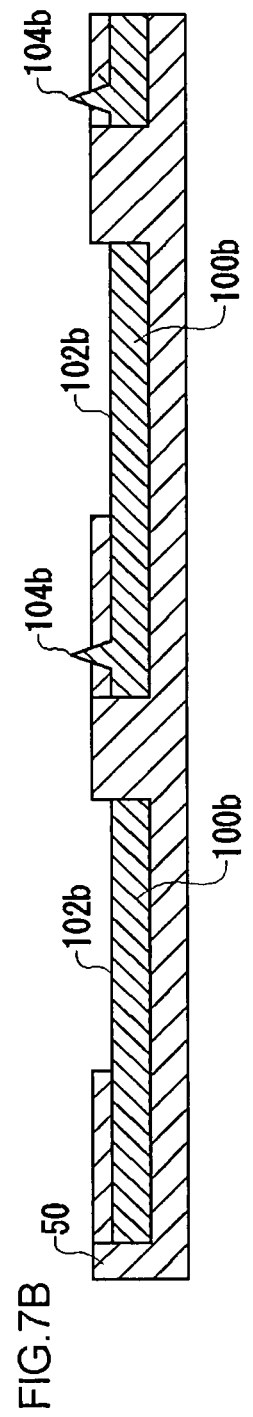
FIG. 7B is a cross-sectional view taken along line B-B' of FIG. 6 in a sealing member used to connect current collectors for a fuel cell.

FIG. 7A and FIG. 7B are cross-sectional views taken along line A-A' and the line B-B' of FIG. 6, respectively. The metal patterns 100a and 100b have their respective contact surfaces 102a and 102b that come in contact with their respective current collectors. A recessed connecting terminal 104a is provided on one end of the metal pattern 100a. A protruding connecting terminal 104b is provided on one end of the metal pattern 100b which is the side opposite to the end of the metal pattern 100a on which the connecting terminal 104a is provided. The regions of the metal patterns 100a and 100b other than the contact surfaces 102a and 102b, which come in contact with their respective current collectors, and the connecting terminals 104a and 104b are coated with a material similar to that of the sealing member 50. This arrangement improves the sealing performance of the sealing member 50. Note that the metal pattern 100b at the end (leftmost in FIG. 7B) of the series connection in FIG. 7B does not need a connecting terminal 104b.

The metal pattern 100a and the corresponding metal pattern 100b are staggered in position so that the connecting terminal 104a of the metal pattern 10a is in opposition to the connecting terminal 104b of the metal pattern 100b of the adjacent cell. The connecting terminal 104a and the connecting terminal 104b can be press-bonded to connect with each other electrically. Thus electrical connection of adjacent cells in series can be accomplished by connecting the connecting terminal 104a of the metal pattern 100a to the connecting terminal 104b of the metal pattern 100b for the adjacent cell.

Figure 8:
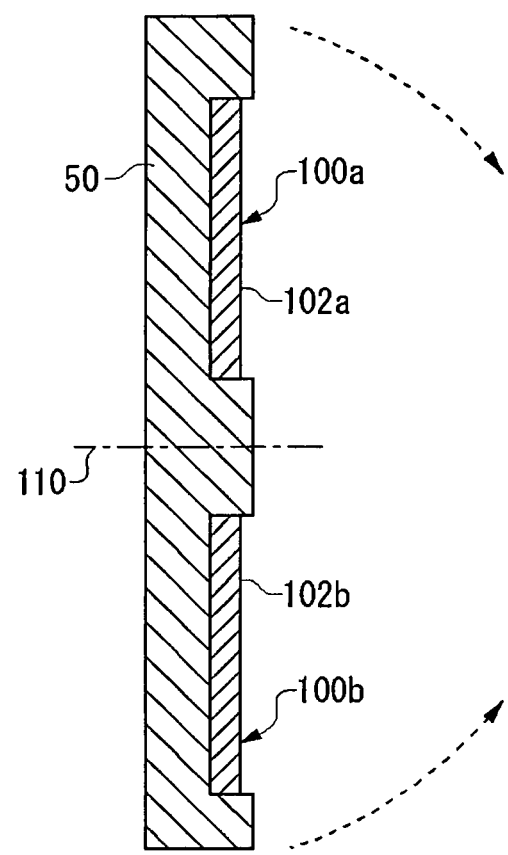
FIG. 8 is a cross-sectional view taken along line C-C' of FIG. 6 in a sealing member used to connect current collectors for a fuel cell.

FIG. 8 is a cross-sectional view taken along line C-C' of FIG. 6. As shown in FIG. 8, the sealing member 50 is folded back at the intermediate line 110 between the row of metal patterns 100a and the row of metal patterns 100b in such a manner that the contact surface 102a and the contact surface 102b face each other.

Figure 9:
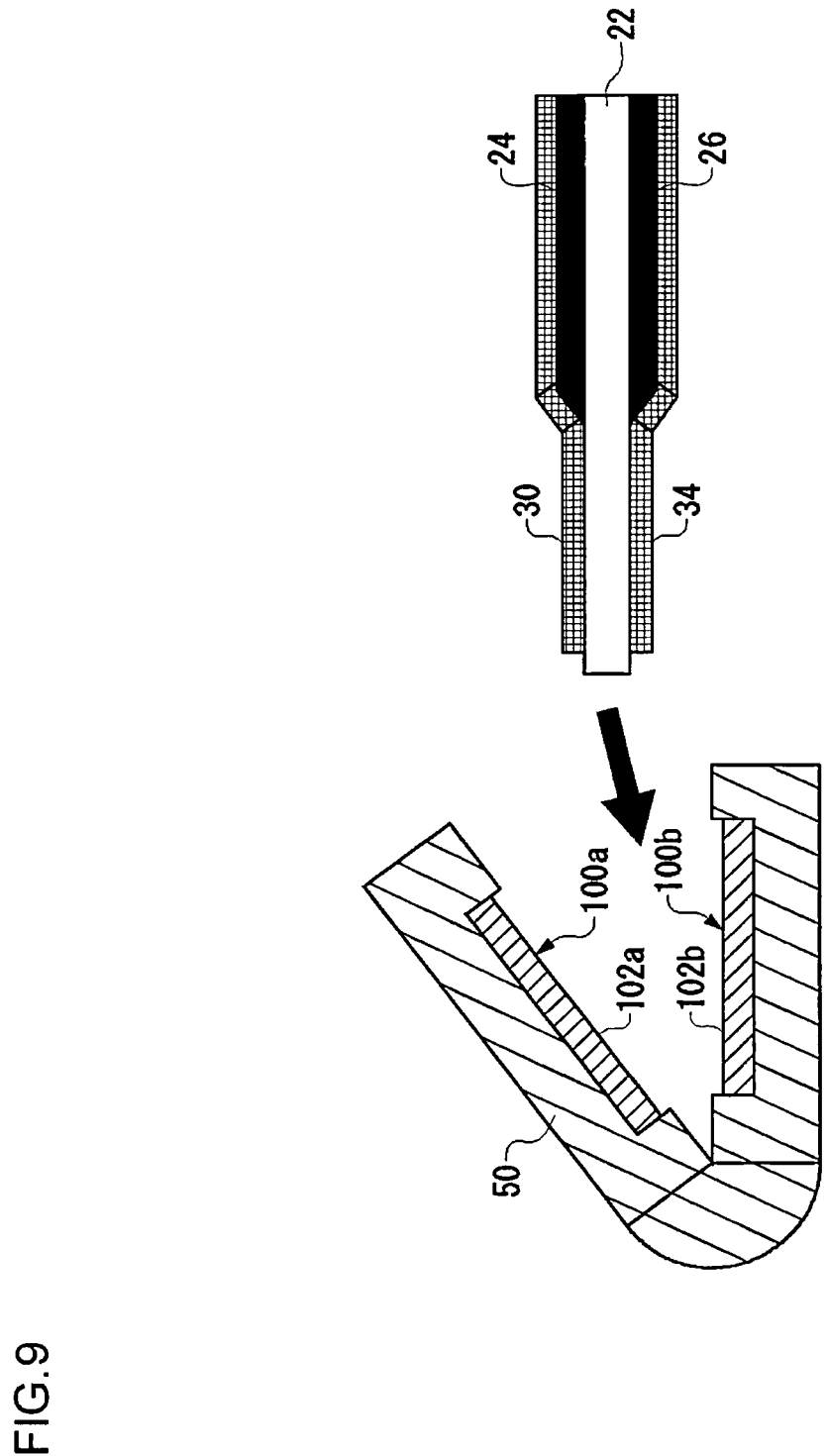
FIG. 9 illustrates how to connect an electrolyte membrane to a sealing member.

Then, as illustrated in FIG. 9, an end of the electrolyte membrane 22 is held between the metal pattern 100a and the metal pattern 100b which face each other, and they are fused together in a hot press. As a result, the current collector 30 of the anode 24 comes in contact with the contact surface 102a of the metal pattern 100a, and the current collector 34 of the cathode 26 comes in contact with the contact surface 102b of the metal pattern 10b. The connecting terminal 104a and the connecting terminal 104*b* as shown in FIG. 7A and FIG. 7B are electrically connected to each other by penetrating through the electrolyte membrane 22. As a result, the metal pattern 100*a* is electrically connected to the metal pattern 100*b* of the adjacent cell to serve as the connector 60 explained in FIG. 5A, FIG. 5B and elsewhere.

It is to be noted that the positions of the metal patterns 100*a* and the metal patterns 100*b* are preferably where the fastening pressure from the anode housing 40 and the cathode housing 42 works. Such an arrangement improves the contact between the metal pattern 100*a* and the current collector 30, the contact between the metal pattern 100*b* and the current collector 34, and the connection reliability of the connecting terminals 104*a* and 104*b*.

The method for forming the connector (interconnector) as described above can simplify the manufacturing process of a fuel cell because leak prevention of fuel or the like and series connection of the adjacent cells can be achieved at the same time.

Figure 10:
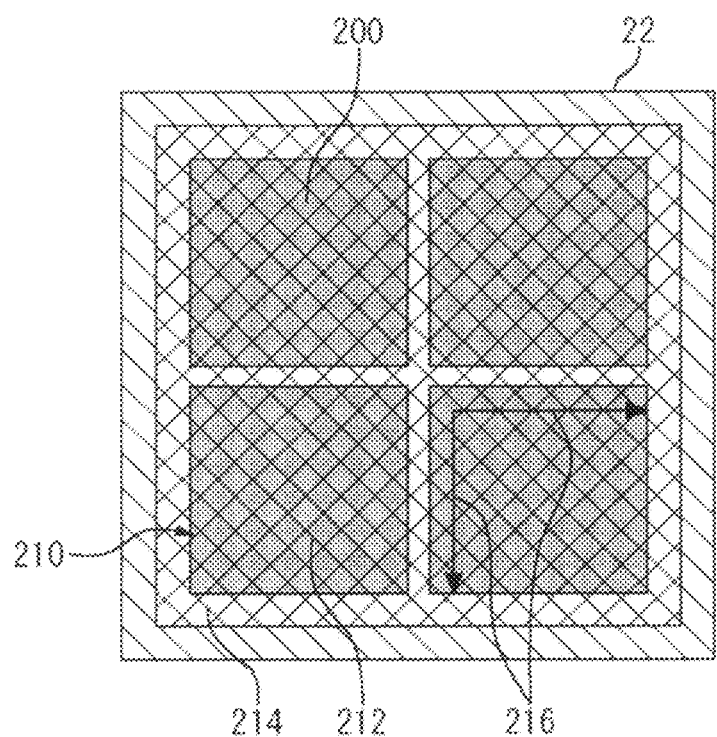
FIG. 10 is a plan view showing a planar array structure where cells are arranged in a matrix.
Figure 11:
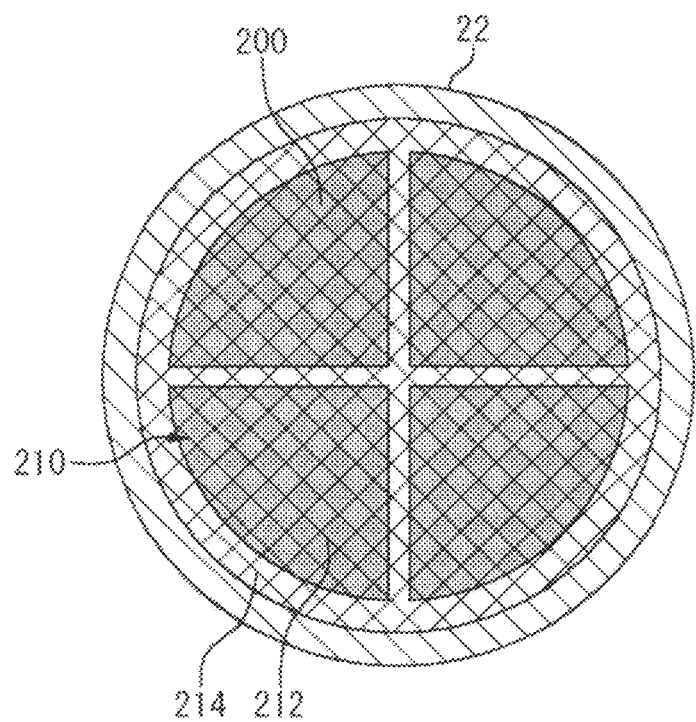
FIG. 11 is a plan view showing a planar array structure where circular cells are arranged.

In the embodiment thus far described, rectangular cells are placed side by side in a planar arrangement, but the arrangement of the cells is not limited thereto. For example, as illustrated in FIG. 10, the cells may be arranged in a matrix on the electrolyte membrane 22. In a fuel cell having the cells as shown in FIG. 10, a current collector 210 having a contact surface 212 in contact with an electrode 200 (anode or cathode) and a terminal 214 projecting in the peripheral edge part of an electrolyte membrane 22 may be provided, so that the adjacent cells may be electrically connected in series by the connector as previously described. Such an arrangement can improve the current collection performance because the contact area between the current collector and the connector can be widened. Also, conducting paths 216 in the current collector 210, which are in two directions intersecting each other, can improve the current collection performance of the current collector 210. Further, as illustrated in FIG. 11, the electrolyte membrane 22 may be circular-shaped and the cells may be formed in the regions divided by the division lines passing the center of the circle. The circular cells as shown in FIG. 11 can also improve the current collection performance of the current collector 210.

The present invention is not limited to the above-described embodiments only, and it is understood by those skilled in the art that various modifications such as changes in design may be made based on their knowledge and the embodiments added with such modifications are also within the scope of the present invention.

For example, in the embodiments thus far described, the current collectors are provided on the anodes and the cathodes, but they are not limited to such an arrangement. For example, the current collectors may be provided between the anodes and the electrolyte membrane and between the cathodes and the electrolyte membrane, respectively, and part of each current collector may be embedded in the electrolyte membrane.

In the embodiments thus far described, the connector is provided along one side of each cell, but a plurality of connector may be formed for each cell. For example, another connector may be provided along the other side of each cell, and after connecting cells in series on each side thereof, the two series connections may be connected in parallel. Such an arrangement can improve the current collection performance in each cell because the conducting path from the catalyst in the electrode to the connector can be shortened.

While the preferred embodiments of the present invention have been described using specific terms, such description is for illustrative purposes only, and it is to be understood that changes and variations may be further made without departing from the spirit or scope of the appended claims.

What is claimed is:

1. A fuel cell, comprising:
    an electrolyte membrane;
    a plurality of anodes provided on one face of said electrolyte membrane;
    a plurality of cathodes provided on the other face of said electrolyte membrane counter to said plurality of anodes so as to form cells;
    anode current collectors provided in association with said plurality of anodes, respectively, each anode current collector comprising a first portion on an associated anode, and a second portion on a first peripheral edge part of the one face of said electrolyte, the first peripheral edge part running along edges of the electrolyte membrane, surrounding the entirety of the plurality of anodes, and being not in direct contact with the plurality of anodes;
    cathode current collectors provided in association with said plurality of cathodes, respectively, each cathode current collector comprising a third portion on an associated cathode, and a fourth portion on a second peripheral edge part of the other face of said electrolyte, the second peripheral edge part running along edges of the electrolyte membrane, surrounding the entirety of the plurality of cathodes, and being not in direct contact with the plurality of cathodes;
    a nonconductive sealing member which seals the first and second peripheral edge parts of said electrolyte membrane; and
    a connector which electrically connects one anode current collector for one cell with one cathode current collector for another cell adjacent to the one cell within the sealing member, wherein
    a width of the second portion of each anode current collector and a width of the fourth portion of each cathode current collector are narrower than a width of an associated anode and a width of an associated cathode, respectively.

2. The fuel cell according to claim 1, wherein said connector is provided in a through hole formed in said electrolyte membrane, the through hole penetrating the electrolyte membrane from the first peripheral edge part of the one face to the second peripheral edge part of the other face, and
    said through hole is positioned between the anode current collectors and between the cathode current collectors of adjacent cells.

3. The fuel cell according to claim 1, wherein
    for each anode current collector, the width of the second portion progressively becomes narrower depending on a distance from a boundary between the first and second portions, and
    for each cathode current collector, the width of the fourth portion progressively becomes narrower depending on a distance from a boundary between the third and fourth portions.

4. The fuel cell according to claim 2, wherein
    for each anode current collector, the width of the second portion progressively becomes narrower depending on a distance from a boundary between the first and second portions, and
    for each cathode current collector, the width of the fourth portion progressively becomes narrower depending on a distance from a boundary between the third and fourth portions.

5. The fuel cell according to claim 1, wherein the nonconductive sealing member entirely seals the first and second peripheral edge parts of said electrolyte membrane.

* * * * *